United States Patent [19]

Padovani

[11] Patent Number: 5,919,496
[45] Date of Patent: Jul. 6, 1999

[54] FLANGING APPARATUS PARTICULARLY FOR HOLLOW ARTICLES OBTAINED BY THERMOFORMING SHEET MATERIAL

[75] Inventor: Pietro Padovani, Verona, Italy

[73] Assignee: ISAP O.M.V. Group SPA, Parona, Italy

[21] Appl. No.: 08/843,261

[22] Filed: Apr. 14, 1997

Related U.S. Application Data

[63] Continuation of application No. 08/424,338, Apr. 25, 1995, abandoned.

[30] Foreign Application Priority Data

Oct. 28, 1992 [IT] Italy .................. VR92A0092

[51] Int. Cl.⁶ .......................... B29C 43/04; B29C 31/08; B29C 53/34
[52] U.S. Cl. ...................... 425/341; 425/340; 425/343; 425/397; 425/400; 264/296; 264/297.5; 264/297.8
[58] Field of Search ................ 264/296, 297.8, 264/551, 297.5; 425/340, 341, 394, 398, 397, 400, 403.1, 342.1, 343

[56] References Cited

U.S. PATENT DOCUMENTS

| | | | |
|---|---|---|---|
| 3,115,677 | 12/1963 | Thiel | 425/340 |
| 3,161,915 | 12/1964 | Thiel | 425/340 |
| 3,651,202 | 3/1972 | Raabe | 264/296 |
| 3,695,806 | 10/1972 | Arfert | 425/398 |
| 3,767,507 | 10/1973 | Stahlecker et al. | 156/382 |
| 3,785,762 | 1/1974 | Butzko | 425/398 |
| 3,874,143 | 4/1975 | Braber | 53/14 |
| 3,917,770 | 11/1975 | Jackson | 264/296 |
| 4,442,064 | 4/1984 | Myers et al. | 264/551 |
| 5,118,277 | 6/1992 | Padovani | 425/384 |
| 5,453,237 | 9/1995 | Padovani | 425/388 |

FOREIGN PATENT DOCUMENTS

| | | |
|---|---|---|
| 257490 | 4/1964 | Netherlands . |
| 278458 | 11/1964 | Netherlands . |
| 2263660 | 8/1993 | United Kingdom . |

*Primary Examiner*—Jan H. Silbaugh
*Assistant Examiner*—Michael Poe
*Attorney, Agent, or Firm*—Ladas & Parry

[57] ABSTRACT

Flanging or curling apparatus particularly for hollow articles obtained by thermoforming from thermoformable sheet material for use in a thermoforming plant equipped with template or mask conveyor for transfer of the thermoformed objects. The apparatus comprises a support frame which delimits at least one workstation for a sequence of masks supporting hot thermoformed objects carried by the conveyor or at least one head for simultaneous curling of all thermoformed objects in the or each workstation.

19 Claims, 3 Drawing Sheets

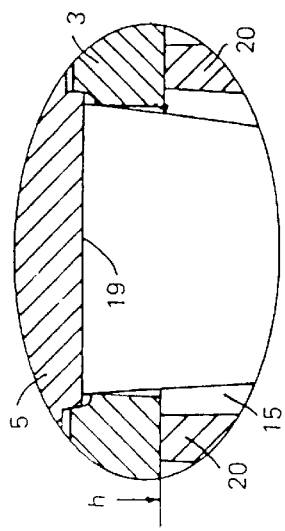
FIG. 5
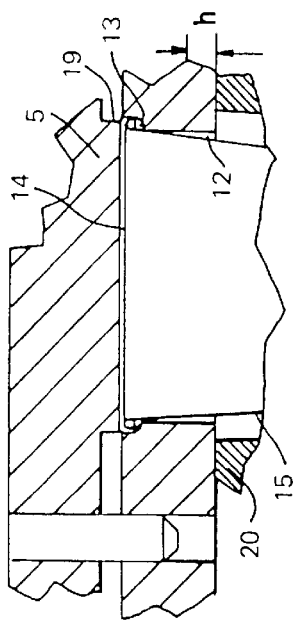
FIG. 3
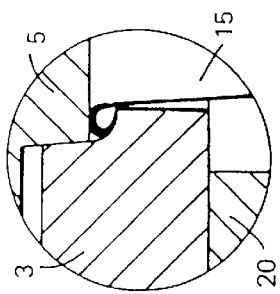
FIG. 6
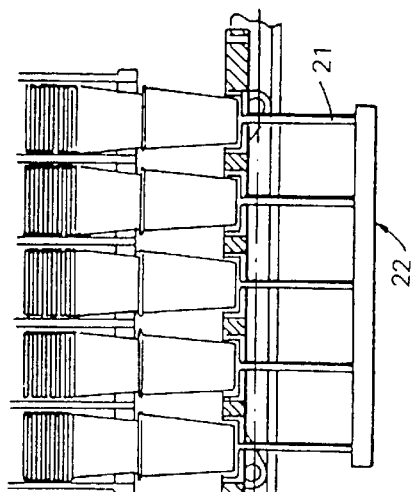
FIG. 4
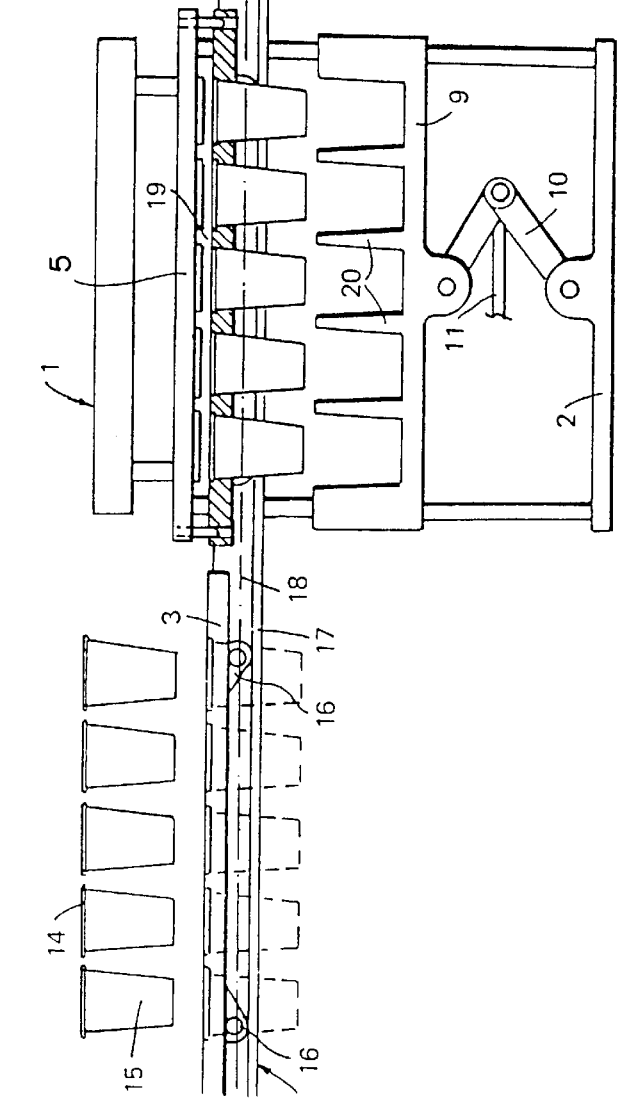

FLANGING APPARATUS PARTICULARLY FOR HOLLOW ARTICLES OBTAINED BY THERMOFORMING SHEET MATERIAL

This is a continuation of application Ser. No. 08/424,338 filed Apr. 25, 1995, now abandoned.

BACKGROUND OF THE INVENTION

1. Field of the Invention

The present invention relates to a flanging or curling device particularly for articles obtained by thermoforming from thermoformable sheet material.

2. Description of Related Art

Various arrangements for the flanging or curling of hollow objects such as beakers, cups, tubs or the like, all having a circular upper perimeter, trays and the like obtained by moulding by thermoforming from a thermoformable synthetic material, especially sheet material, have been proposed. See for example Italian Patent No. 85008 A/89 filed on the Dec. 18, 1989 in the name of O.M.V. Spa.

The arrangements proposed hitherto invariably provide for the supply of heat to the object to be curled before or during the flanging stage so that the edge of the article being flanged is suitably heated. This is because the flanging operation takes place after the hollow objects have been thermoformed and stacked. Of course in order to be transferred to a flanging machine the objects have to be first transferred to a separating or unstacking station arranged to separate the objects from each other and deliver them in sequence to a feeder for the flanging machine. Feeders with preheated rollers threaded with a variable pitch for progressive separation of the objects are widely used in the art.

Belt or suction tube feeding devices which are however, like roller feeders, only used for flanging round objects have also been proposed.

The flanging device in turn substantially comprises a generally fixed seat to receive an object to be curled and a die which is designed to mate with the inner edge of the receiving seat engaged by the partly curled edge of the object which is to be flanged.

With the high levels of productivity which can be achieved with the most up-to-date and sophisticated thermoforming units with mask conveyors, see Patent Application No. VR92A000012 filed on the Mar. 2, 1992 in the name of O.M.V. Spa, or other known systems, a conventional flanging device is not capable of keeping up with production line work where polypropylene or polyethylene, or the like are used.

SUMMARY OF THE INVENTION

An object of the present invention is to provide a flanging or curling apparatus which is capable of overcoming the abovementioned disadvantages and which is therefore able to work in an integrated way with modern thermoforming machinery.

A specific object of the present invention is that the said curling or flanging apparatus is able to effect the simultaneous flanging of all the objects obtained in one moulding operation in the thermoforming unit, within the cycle time of the thermoforming unit and without the provision of external heat to the objects, but taking advantage of the objects' heat of thermoforming.

Another object of the present invention is that the said flanging apparatus is structurally very simple to manufacture and of high reliability and productivity.

These and other objects which will be more apparent below are achieved by a curling or flanging apparatus particularly for hollow articles obtained by thermoforming from thermoformable sheet material according to the invention for use in a thermoforming plant provided with a mask conveyor for transfer of the thermoformed objects, which apparatus comprises a supporting frame which delimits at least one workstation for a sequence of masks supporting hot thermoformed objects carried by the conveyor and at least one head for the simultaneous flanging of all objects at the or each workstation.

Further features and advantages of this invention will be more apparent from the following detailed description of some embodiments given by way of example with reference to the appended drawings.

BRIEF DESCRIPTION OF PREFERRED EMBODIMENTS

FIG. 3 is a view in partial cross-section and on a larger scale of an object seated in a supporting mask before the flanging operation;

FIG. 4 is a view similar to that in FIG. 1, but which illustrates a further embodiment in which the upper die support is fixed and the flanging apparatus is in the position in which flanging is started;

FIG. 5 illustrates a view similar to that in FIG. 3, but which illustrates supporting mask after the flanging operation, and FIG. 6 shows a detail of FIG. 5 on a larger scale.

DESCRIPTION OF PREFERRED EMBODIMENT

Figure 1:
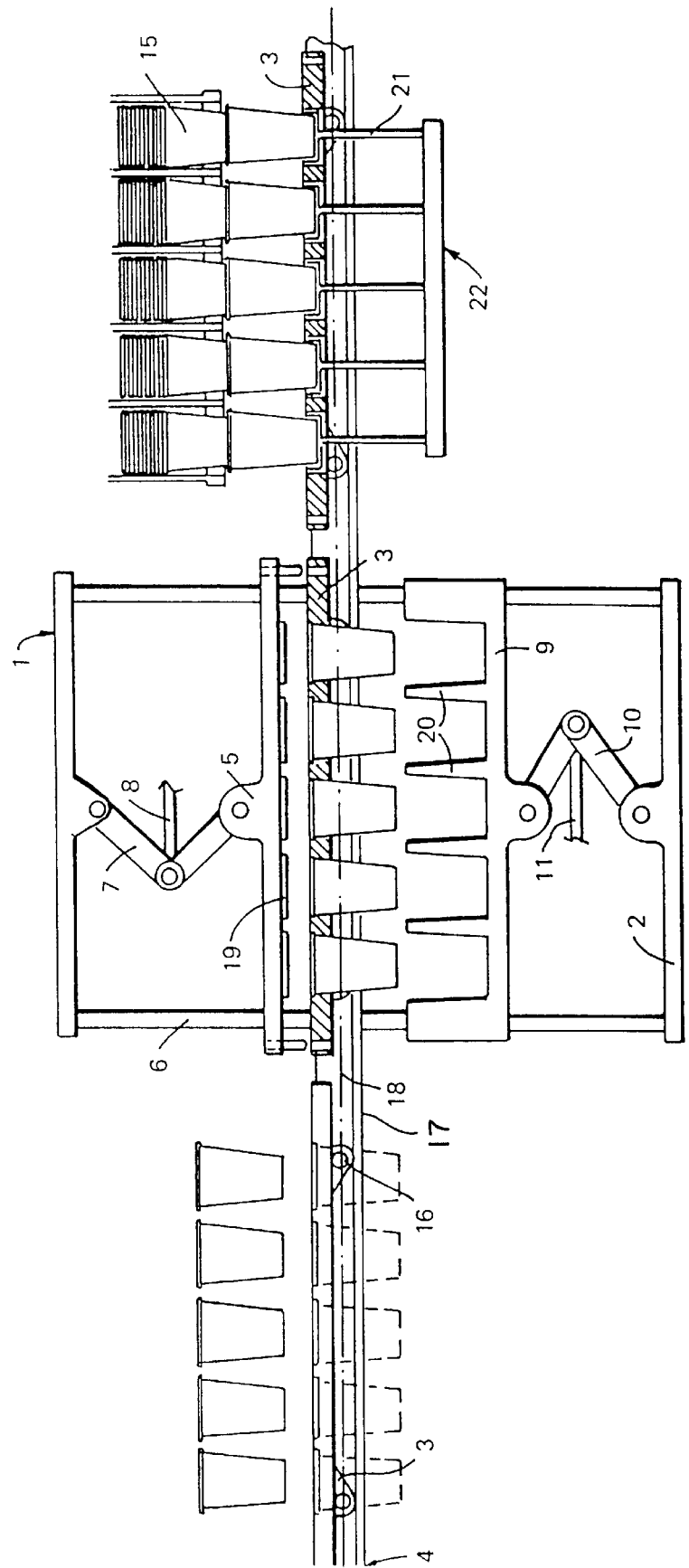
FIG. 1 is a diagrammatical view in front elevation of a first embodiment of the flanging device with an upper die support and a lower opposing frame, each of which are capable of movement, illustrated in the position following the loading of a mask loaded with objects into the workstation.

With reference to the FIGS. listed above, it will be noted that a curling or flanging apparatus or device 1 according to the present invention comprises a supporting frame 2 delimiting therein a workstation through which passes a sequence of masks 3 forming part of a mask conveyor 4 which passes through frame 2. In the upper part the workstation is delimited by an upper male die support 5 which is mounted so as to slide along guides or uprights 6 and can be operated e.g. by means of a toggle device actuated by a rod 8 which, in turn, can be driven synchronously with the working rate of a thermoforming unit. Below, the workstation may be delimited by an opposing frame 9 which is mounted slidably on guides or uprights 6 and is driven for example by a toggle device 10 controlled by a rod 11 which is driven synchronously with rod 8.

Advantageously the female die is comprised of the various masks 3 which stop in sequence at the workstation.

As will be better seen in FIGS. 3 and 5, each mask 3 has a plurality of seats 12, for example 25 circular openings arranged in rows or offset or in any desired arrangement, each having a shaped and gauged peripheral recess 13 alongside their inner edge. Advantageously the number of seats 12 in each mask is equal to the number of impressions by the thermoforming unit, in which case each mask is capable of receiving all the objects produced in one moulding operation on each occasion.

Shaped recess 13 is designed to be engaged by the trimmed edge 14 of an object 15, such as e.g. a beaker or a pot of thermoformable material, e.g. directly discharged from the thermoforming unit, and therefore still relatively hot.

In the drawing masks 3 are illustrated in the form of trolleys with four wheels 16, which are designed to run on straight supporting guides 17 extending through the workstation, and are drawn e.g. by a chain or pair of chains 18 which act intermittently so as to displace masks 3 stepwise in accordance with the rate of the operating cycle of the thermoforming unit.

Advantageously stop and securing means for masks 3 can be provided at the workstation, e.g. stops with an inclined plane, which ensure correct positioning between mask 3 and die 5, making use of the yielding of automatic tensioners 23 for chain or chains 18.

Correspondingly male die support 5 has as many projections 19 as there are seats 12, each projection being arranged so as to be centred above a corresponding seat 12 and gauged so as to mate accurately with recess 13. Opposing frame 9, which in turn may advantageously incorporate a plurality of posts or other projecting portions 20 designed to engage beneath the various masks 3 located at the workstation to compensate for the dynamic loading imparted to each mask by male die support 5 when the latter is lowered in order to flange objects 15 supported therein.

The flanging stroke is indicated by h in FIGS. 3 and 5 and this corresponds to the depth of penetration of each projection 19 into the recess in the seat lying beneath. The curling of edge 14 of each object is performed hot, directly taking advantage of the heat of thermoforming still available in objects 15, i.e. without resorting to the supply of additional heat provided by additional heat sources. Flanging is therefore performed immediately after the objects have been removed from the thermoforming mould, but before any other processing or handling, and in any event before they are stacked by means of pusher devices 21 in a subsequent workstation, generically indicated by 22, with a resulting appreciable saving in thermal energy, and always within the cycle time of the thermoforming unit.

Figure 2:
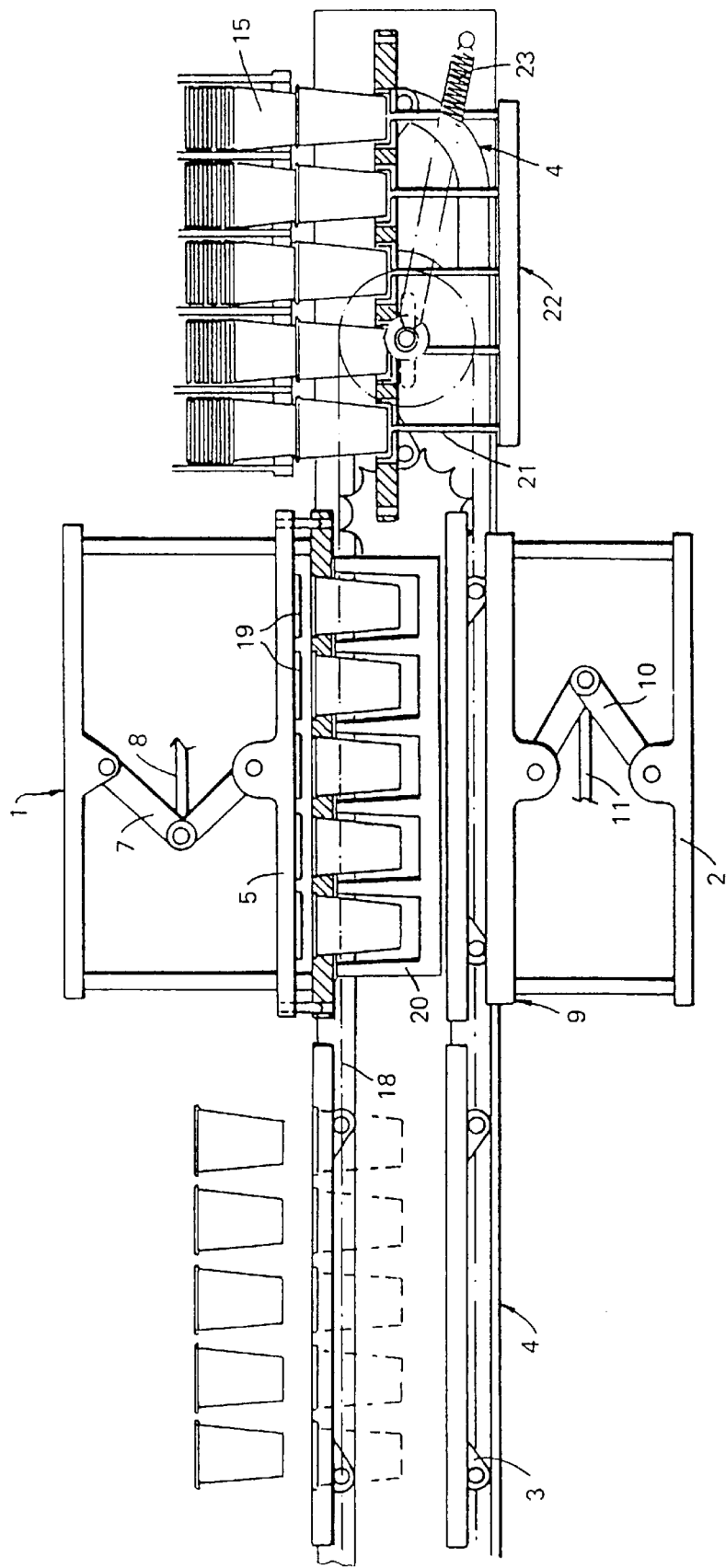
FIG. 2 illustrates another embodiment in a view similar to that in FIG. 1 with the flanging apparatus in the position in which it starts curling or flanging but with an opposing frame located between a forward and a return run or length of the mask conveyor.

FIG. 2 shows an embodiment in which both the working (upper) run of conveyor 4 loaded with objects 15 and the (lower) empty return run pass through the workstation within the flanging apparatus. In this case two masks are present at the workstation at the same time, an upper one loaded with objects 15 and a lower empty one, and opposing frame 9 is subdivided into two portions—an upper portion incorporating the posts or other portions in relief 20 located between the two masks in the workstation and a lower portion beneath the empty mask.

In the embodiment in FIG. 4 upper die support 5 is fixed. Opposing frame 9 therefore has the function of pushing and raising mask 3 loaded with the objects 15 which require flanging against support 5, making use of the yielding of automatic tensioners 23 for chain or chains 18.

Detachment between support 5 and mask 3 takes place as a result of the resilient force exerted by the automatic chain tensioner or tensioners 23 (see FIG. 2).

The apparatus described above is susceptible of many modifications and variations within the protection scope defined by the claims below.

It will be appreciated that the flanging device described above can effect the flanging of thermoformed containers regardless of the geometric profile of their mouths, which may be round or of some other configuration.

I claim:

1. A curling or flanging apparatus for flanging thermoformed hollow objects formed in a thermoforming unit having a mask conveyor and a plurality of masks thereon, each mask having a number of seats, the mask conveyor having a path, the curling or flanging apparatus being adapted to be used with the thermoforming unit and arranged about the path of the mask conveyor, the curling or flanging apparatus comprising:

a supporting frame carrying an outer male die support adapted to be disposed above the mask conveyor, the male die support having downwardly facing die projections, each die projection being gauged so as to enable it to mate with a respective seat in a mask;

an opposing frame arranged below the male die support such that the path of the mask conveyor may be disposed between the male die support and the opposing frame, the opposing frame being slidably mounted on vertical guides so as to be movable towards and away from the make die support; and driving means for actuating either the male die support or the opposing frame or both for moving together and moving apart the male die support and the opposing frame, whereby the curling or flanging apparatus is configured to be placed sufficiently proximal the thermoforming unit so that the thermoformed hollow objects have at least some thermoforming heat therein and no further heat is provided to the themoformed hollow objects.

2. A curling or flanging apparatus as claimed in claim 1, further comprising centering means mounted alongside the supporting frame to facilitate accurate vertical alignment between mask and the upper male die.

3. A curling or flanging apparatus as claimed in claim 2, wherein said centering means comprises resilient tensioners for said mask conveyor, which also act as detaching means between the male die and the mask after each curling operation.

4. A curling or flanging apparatus as claimed in claim 2, wherein said centering means comprises stops arranged alone an incline for the masks to slidably engage therewith.

5. A curling or flanging apparatus as claimed in claim 1, wherein said opposing frame comprises a plurality of projecting portions designed to engage beneath a mask while the same is matching with the male die.

6. A curling or flanging apparatus as claimed in claim 1 wherein two runs of said mask conveyor, extend below said upper male die support and above said opposing frame, whereby a pair of masks are in substantial vertical alignment at the same time, an upper one loaded with objects and a lower empty one, and wherein said opposing frame is subdivided into an upper portion provided with upper projecting portions and located between each pair of masks and a lower portion located beneath the empty mask.

7. A curling or flanging apparatus as claimed in claim 1, wherein said driving means comprises at least one toggle device.

8. A curling or flanging apparatus as claimed in claim 3, wherein said centering means comprises an inclined plane arrangement for the masks to slidably engage therewith.

9. A curling or flanging apparatus as claimed in claim 2 wherein said opposing frame comprises a plurality of projecting portions designed to engage beneath a mask while the same is matching with the male die.

10. A curling or flanging apparatus as claimed in claim 3 wherein said opposing frame comprises a plurality of projecting portions designed to engage beneath a mask while the same is matching with the male die.

11. A curling or flanging apparatus as claimed in claim 4 wherein said opposing frame comprises a plurality of projecting portions designed to engage beneath a mask while the same is matching with the male die.

12. A curling or flanging apparatus as claimed in claim 2, wherein two runs of said mask conveyor, extend below said upper male die support and above said opposing frame, whereby a pair of masks are in substantial vertical alignment at the same time, an upper one loaded with objects and a lower empty one, and wherein said opposing frame is subdivided into an upper portion provided with upper projecting portions and located between each pair of masks and a lower portion located beneath the empty mask.

13. A curling or flanging apparatus as claimed in claim 3, wherein two runs of said mask conveyor, extend below said upper male die support and above said opposing frame, whereby a pair of masks are in substantial vertical alignment at the same time, an upper one loaded with objects and a lower empty one, and wherein said opposing frame is subdivided into an upper portion provided with upper projecting portions and located between each pair of masks and a lower portion located beneath the empty mask.

14. A curling or flanging apparatus as claimed in claim 4, wherein two runs of said mask conveyor, extend below said upper male die support and above said opposing frame, whereby a pair of masks are in substantial vertical alignment at the same time, an upper one loaded with objects and a lower empty one, and wherein said opposing frame is subdivided into an upper portion provided with upper projecting portions and located between each pair of masks.

15. A curling or flanging apparatus as claimed in claim 2, wherein said driving means comprises at least one toggle device.

16. A curling or flanging apparatus as claimed in claim 3, wherein said driving means comprises at least one toggle device.

17. A curling or flanging apparatus as claimed in claim 4, wherein said driving means comprises at least one toggle device.

18. A curling or flanging apparatus as claimed in claim 5, wherein said driving means compises at least one toggle device.

19. A curling or flanging apparatus as claimed in claim 6, wherein said driving means comprises at least one toggle device.

* * * * *